United States Patent [19]

Uematsu et al.

[11] Patent Number: 4,676,112
[45] Date of Patent: Jun. 30, 1987

[54] ELECTROMAGNETIC FLOW METER

[75] Inventors: Ikuo Uematsu; Toshio Takahashi, both of Katsuta, Japan

[73] Assignee: Hitachi, Ltd., Tokyo, Japan

[21] Appl. No.: 836,824

[22] Filed: Mar. 6, 1986

[30] Foreign Application Priority Data

Mar. 8, 1985 [JP] Japan ................................ 60-44811

[51] Int. Cl.$^4$ ............................................. G01F 1/60
[52] U.S. Cl. ...................................... 73/861.17; 73/3
[58] Field of Search .................... 73/3, 861.12, 861.16, 73/861.17

[56] References Cited

U.S. PATENT DOCUMENTS 4,545,257 10/1985 Tomita ............................ 73/861.17

FOREIGN PATENT DOCUMENTS

0112226 6/1984 Japan ................................ 73/861.16

Primary Examiner—Charles A. Ruehl
Attorney, Agent, or Firm—Antonelli, Terry & Wands

[57] ABSTRACT

An electromagnetic flow meter which performs a zero-point and span calibrating operation and an initial setting verifying operation in an inspection mode which is inserted on an interrupt basis at a certain frequency during a measurement mode. Flow measurement data in each inspection mode is calculated using measurement data preceding and/or following the inspection mode, whereby an inspection operation is implemented without leaving the flow measurement data indeterminate in each period of the inspection mode.

9 Claims, 8 Drawing Figures

ELECTROMAGNETIC FLOW METER

BACKGROUND OF THE INVENTION

This invention relates to an electromagnetic flow meter and, particularly, to an electromagnetic flow meter designed for easy zero-point and span calibration for the flow signal converter and confirmation of preset initial values without suspending the flow rate measurement.

Figure 1:
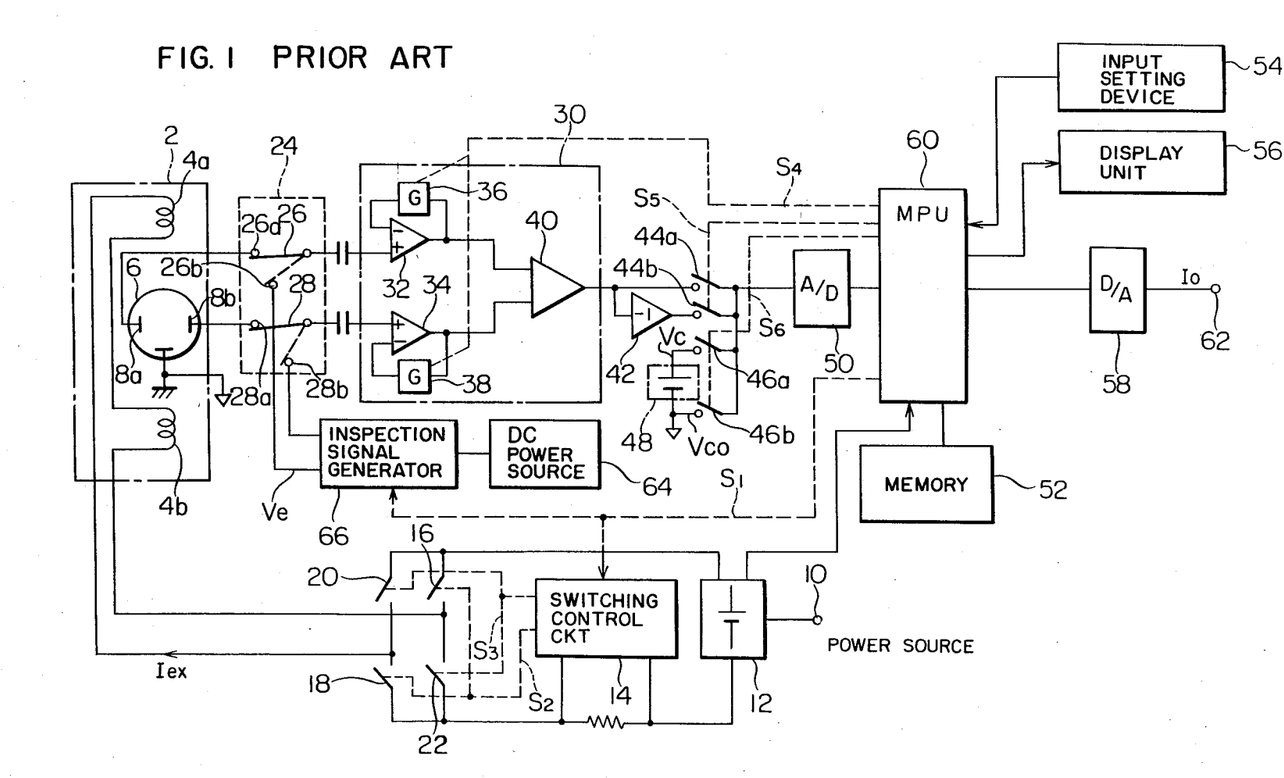
FIG. 1 is a schematic diagram of the conventional electromagnetic flow meter.
Figure 2:
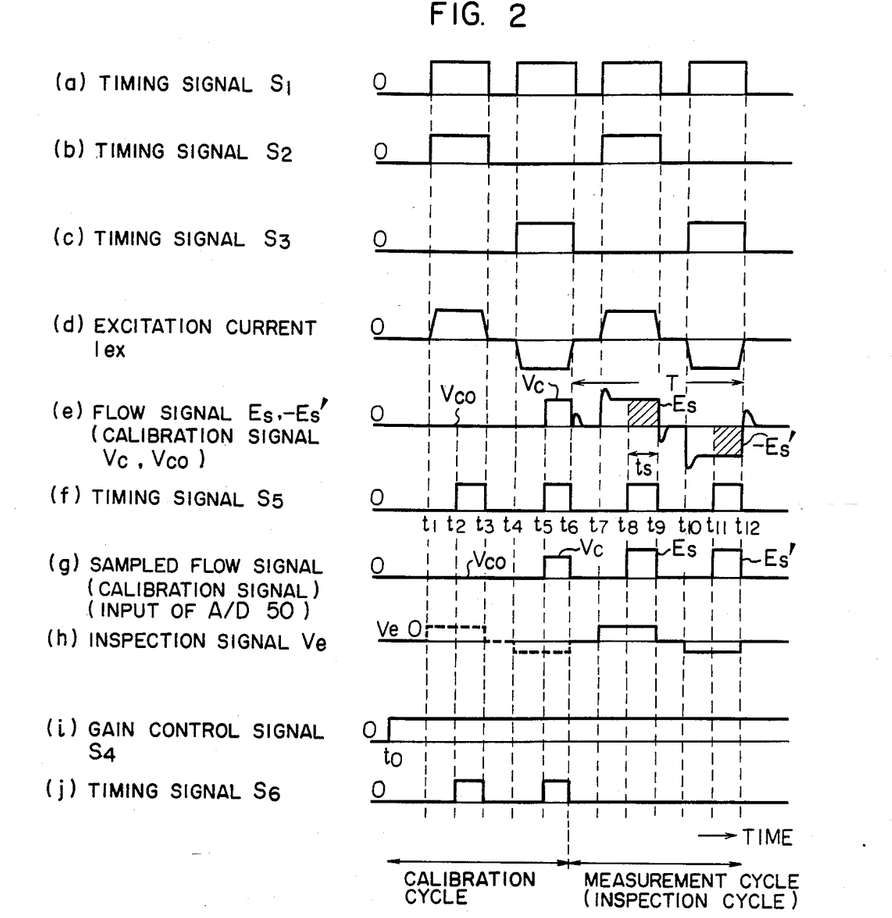
FIG. 2 is a timing chart showing the signal waveforms at various portions of the circuit arrangement shown in FIG. 1.

FIG. 1 is a schematic diagram exemplifying the conventional electromagnetic flow meter having a flow sensor and a flow signal converter, and FIG. 2 is a timing chart showing the signal waveforms at various portions of the circuit. In FIG. 1, reference number 2 denotes a flow sensor which consists of excitation windings 4a and 4b, a conduit 6 with insulated interior surface through which liquid under measurement flows, and electrodes 8a and 8b. The excitation windings 4a and 4b produce a magnetic field in a rectangular waveform in the direction perpendicular to the electrode mount position and to the flow of liquid under measurement. In this example, the excitation windings 4a and 4b are connected through semiconductor switch pairs 16, 18 and 20, 22 to a constant current source 12. The constant current source 12 rectifies the power supply current received at the terminal 10 from a power supply source (not shown) and supplies the rectified output to the semiconductor switches 16 and 22. A microprocessor (MPU) 60 produces a reference frequency signal on the basis of the power supply current. The MPU 60 provides a timing signal S1 shown in (a) of FIG. 2 to a switching control circuit 14, which then provides a timing signal S2 ((b) of FIG. 2) to the semiconductor switch pair 16 and 18 and another timing signal S3 ((c) of FIG. 2) to the semiconductor switch pair 20 and 22, so that the switch pairs are turned on and off alternately. This switching operation causes the excitation windings 4a and 4b to flow an excitation current Iex shown in (d) of FIG. 2.

Flow signals generated on the electrodes 8a and 8b are conducted through switches 26 and 28 in the switch circuit 24 for selecting either a measurement mode or an inspection mode and delivered through noise blocking capacitors to the differential amplifying circuit 30. The amplifying circuit 30 includes buffer amplifiers 32 and 34 having high impedance input and a differential amplifier 40. The buffer amplifiers 32 and 34 have variable gain which is controlled through the adjustment of, for example, variable resistors in the gain setting circuits 36 and 38 provided on the feedback path of the amplifiers 32 and 34 in response to the gain switching signal S4 ((i) of FIG. 2). The values of gain are calculated from the inner diameter of the sensor, the flow rate measurement range (span), etc. which the MPU 60 has received from the input setting device 54, and the settings of gain in the circuits 36 and 38 are switched selectively in response to the gain switching signal S4 in accordance with the setting on the input setting device 54.

The differential amplifier 40 produces an output signal having a waveform shown in (e) of FIG. 2, and it is supplied as a flow signal to an inverting amplifier 42 and semiconductor switches 44a and 44b. A positive output of the differential amplifier 40 causes the semiconductor switch 44a to close and semiconductor switch 44b to open, and the flow signal is delivered via the switch 44a to an A/D converter 50. Conversely, a negative output of the differential amplifier 40 causes the semiconductor switch 44a to open and the 44b to close, and the flow signal is reversed for its polarity and then delivered via the switch 44b to the A/D converter 50. The A/D converter 50 produces a signal with a frequency proportional to the flow signal, and it is supplied to the MPU 60. The switches 44a and 44b are controlled by the timing signal S5 ((f) of FIG. 2) from the MPU 60 so that the switch 44a is closed by the timing signal S5 when the flow signal is positive and the switch 44b is closed by the timing signal S5 when the flow signal is negative, for example. Accordingly, the input signal of the A/D converter 50 has a waveform shown in (g) of FIG. 2.

Reference number 48 denotes a calibration signal generator which provides the calibration signal for the A/D converter 50. The signal generator 48 is a d.c. voltage source providing a d.c. voltage signal of a few volts (i.e. a span signal Vc) and another signal of zero volt (i.e. a zero signal Vco), with its positive and negative output terminals connected through switches 46a and 46b, respectively, to the input of the A/D converter 50. The switches 46a and 46b are controlled by the timing signal S6 shown in (j) of FIG. 2 which is synchronized with the timing signal S5, so that the switches 46a and 46b are closed alternately by the timing signal S6 prior to the flow signal sampling operation, i.e. a measurement process cycle, which is performed by alternately closing the switches 44a and 44b as shown in a period of $t_7$–$t_{12}$ in FIG. 2. Consequently, the zero signal and the span signal of the calibration signal are supplied to the A/D converter 50 through the switch 46a at a period $t_2$–$t_3$ and a period $t_5$–$t_6$, respectively, as shown in a period of $t_1$–$t_6$ in (e) of FIG. 2. The MPU 60 reads the output frequencies of the A/D converter 50 respectively corresponding to the zero and span signals, compares them with the reference values stored in the memory 52 respectively, and, displays the result of comparison. Further, if they do not agree, displays an error message on the display unit 56. Thus, a calibration process cycle is performed in a period of $t_1$–$t_6$ prior to each of the measurement process cycle.

The MPU 60 implements various timing controls and arithmetic operations for the overall circuit. The MPU 60 reads the measurement conditions set on the input setting device 54 including, for example, the inner diameter and span of the sensor and the unit of flow measurement calculates basing on these parameters the value of flow rate from the frequency flow signal provided by the A/D converter 50, and delivers the result of calculation to a D/A converter 58.

Figure 3:
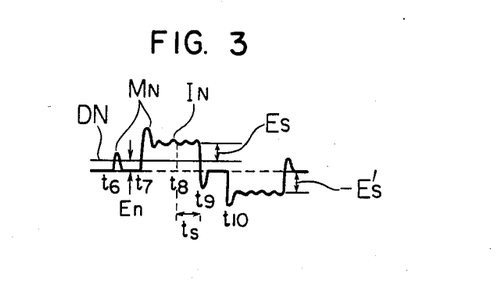
FIG. 3 is a detailed waveform diagram for the flow signal shown in FIG. 2.

The differential amplifier 40 produces the flow rate signal having a waveform shown in a period of $t_1$–$t_{12}$ in (e) of FIG. 2, and it is shown in more detail for the range T between time points t6 and t12 in FIG. 3. The waveform is made up of four components including a signal voltage Es proportional to the flow velocity of liquid, a magnetically-induced noise voltage MN which arises when the polarity of the excitation current Iex, i.e., the magnetic field, varies on the time axis, an inductive noise voltage IN originating from the commercial power supply, and a d.c. noise voltage Eo created in a loop circuit including the liquid under measurement and the electrodes 8a and 8b, and in the circuit of the converter.

Among the four voltage components, the electromagnetic flow meter needs to extract the signal voltage SV which is proportional to the liquid flow velocity.

For this purpose, the switch 44 operates to sample the flow signal during the period ts after the magnetically-induced noise MN caused by the transition of polarity of the excitation current has subsided until the excitation current is cut off. In addition, the flow signal is integrated during the period ts so that the inductive noise IN is averaged out. The MPU 60 implements the following computation in order to remove the d.c. noise Eo.

$$\frac{(Es + Eo) - (-Es' + Eo)}{2} = \frac{Es + Es'}{2}$$

where Es represents a positive flow signal, −Es' represents a negative flow signal, and Eo represents a d.c. noise voltage.

The flow signal including only the signal voltage component Es (Es') obtained as described above is converted by the D/A converter 58 into a unified electrical signal Io having the amplitude within the range corresponding to the setup span. In this way, the calculated flow signal is delivered every measurement cycle. Thus, the calibration process cycle and the measurement process cycle are performed alternately in a measurement mode. In the calibration process cycle, the calculated value which was obtained in the preceeding measurement process cycle and held in the memory is delivered.

The foregoing electromagnetic flow meter necessitates an inspection operation including the zero-point adjustment which is performed by adjusting the gain of the differential amplifying circuit 30 basing on the measurement of the deviation of characteristics of the circuit 30 as a response to the application of a certain voltage from the standard curve and the calibrating operation for the span. Moreover, this flow meter needs the self diagnostic operation for monitoring as to whether the supply voltage and input signal levels are within the preset normal ranges. The self diagnostic operation takes place during the flow measurement operation, i.e. the measurement mode, whereas the inspection operation needs the switching from the measurmenet mode to an inspection mode for performing the inspection operation by changing over the switches 26 and 28 from the side of the sensor to the side of an inspection signal generator 66 as shown by the dashed line, i.e., the inspection operation requires the power supply to the overall flow meter to be turned off temporarily, which means the suspension of measurement.

In the inspection mode, the power supply to the circuit is activated except for the sensor. The inspection signal generator 66 supplies the inspection voltages (a pregiven voltage of a few millivolts) of opposite polarities from the d.c. power source 64 to the terminals 26b and 28b of the switches 26 and 28 alternately. The inspection voltage Ve has a waveform shown in (h) of FIG. 2, and the Ve is equivalent to the output signals from the electrodes 8a and 8b, respectively. At first, the switches 46a and 46b are closed alternately to deliver the calibration signals to the A/D converter 50 to thereby perform the calibration process cycle. Then, the inspection signal Ve is applied to the A/D converter 50 as shown in a period of $t_6-t_{12}$ of (h) of FIG. 2 and the output thereof is estimated to thereby perform as inspection process cycle. Thus, in the inspection process cycle, the MPU 60 reads the output of the differential amplifier 40 corresponding to the inspection signal Ve through the A/D converter and displays the deviation of the zero-point etc. from the zero point or span point of the flow meter calibration curve on the display unit 56. Thus, in the inspection mode, the calibration process cycle and the inspection process cycle are alternately performed. However, during the operation in the inspection mode, the sensor 2 does not produce the measurement output and so the measurement process cycle is not performed, so that the measurement result is absent during the calibration period.

SUMMARY OF THE INVENTION

This invention contemplates to solve the foregoing prior art deficiency, and its prime object is to provide an electromagnetic flow meter capable of calibrating the zero-point and span of the flow signal converter and verifying the initial setting values without the need of suspending the flow measurement.

In order to achieve the above objective, the inventors of this invention have paid attention to the fact that the variation in the flow measurmeent result is rather moderate in general. The inventive electromagnetic flow meter performs the zero-point and span calibrating operation and the initial setting verifying operation in an inspection mode which is inserted on an interrupt basis at a certain frequency during a measurement mode, with flow measurement data in each inspection mode being calculated using measurement data preceding and/or following the inspection mode, whereby the inspection operation is implemented without leaving the flow measurement data indeterminate in each period of the inspection mode.

DESCRIPTION OF THE PREFERRED EMBODIMENT

Figure 4:
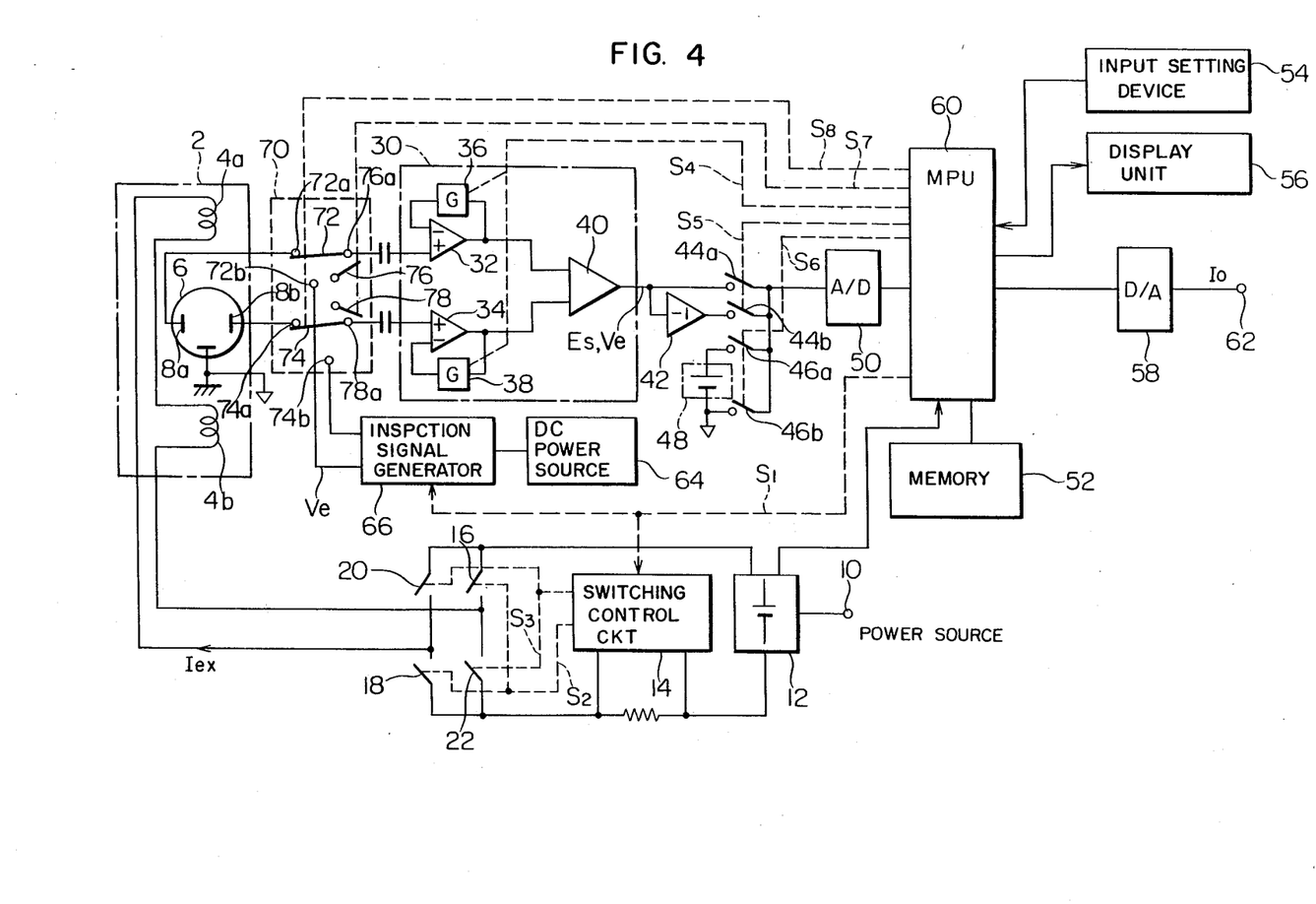
FIG. 4 is a schematic diagram of the electromagnetic flow meter embodying the present invention.
Figure 5:
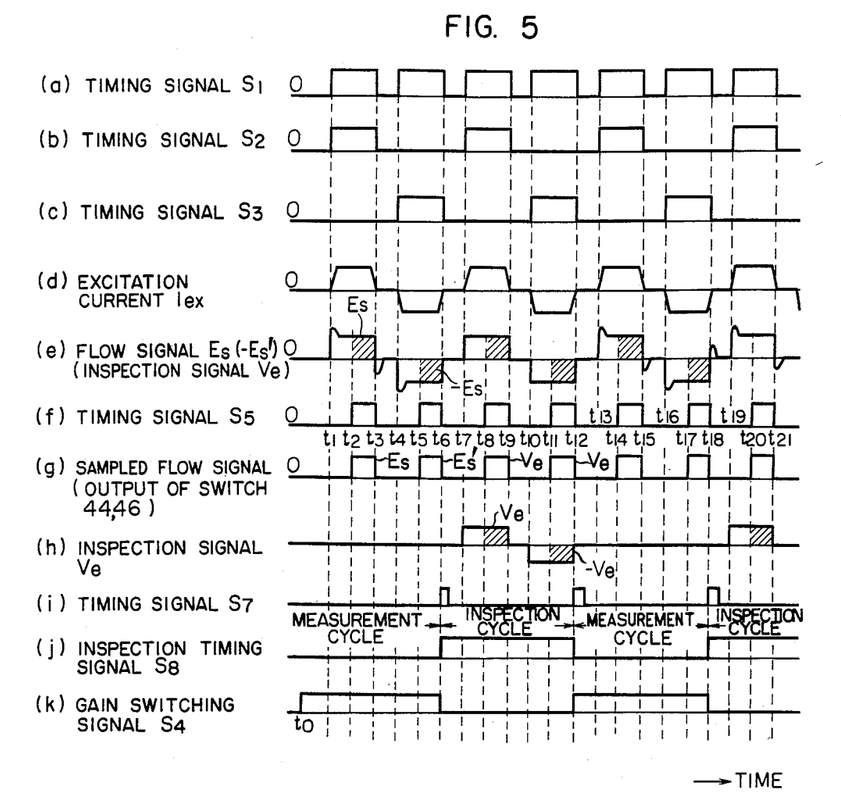
FIG. 5 is a timing chart showing the signal waveforms at various portions of the circuit arrangement shown in FIG. 4.

FIG. 4 is a schematic diagram of the electromagnetic flow meter embodying the present invention, and FIG. 5 is a timing chart showing the signal waveforms observed at various portions of this circuit arrangement. In FIG. 4, functional blocks identical to those in FIG. 1 are referred to by the common symbol and explanation thereof will be omitted in the following description.

The arrangement of FIG. 4 includes a switch circuit 70 which selectively connect one of the output of the sensor electrodes 8a, 8b and the output of the inspection signal generator 66 to the differential amplifier 30. The switch circuit 70 incorporates semiconductor switches 72 and 74, whose common terminals are made in contact with the output terminals 72a and 74a, respectively, during the low-level period of an inspection timing signal S8 ((j) of FIG. 5) issued by the MPU 60 so that the flow signals from the sensor 2 are delivered to the converter for the operation in a measurement mode. When the timing signal S8 goes high, the switches 72 and 74 have their common terminals connected with the respective output terminals 72b and 74b so that the inspection signal Ve ((h) of FIG. 5) from the inspection signal generator 66 is supplied to the A/D converter for the operation of an inspection process cycle in an inspection mode. At the transition of the process cycle, the operation of the switches 72 and 74 causes the differential amplifier circuit 30 to have its input terminal open, resulting in the saturation of the variable-gain amplifiers 32 and 34. To avoid this impropriety for the case of transition from the calibration process cycle to the inspection process cycle, the MPU 60 issues the input-shorting timing signal S7 to the semiconductor switches 76 and 78 at a time point after the span signal of the calibration signal has been sampled until the inspection process cycle begins, i.e., just after $t_6$ in FIG. 5, so that the terminals 76a and 78a are short-circuitted.

Now, in FIG. 5, the calibration process cycle each of which is to be executed before each of the measurement and inspection process cycles, is eliminated so as to simplify the explanation of the invention. In the following period between $t_6$ and $t_{12}$, the switches 72 and 74 are positioned to the output terminals 72b and 74b, respectively, for the operation of the inspection process cycle. Similarly, at the transition from the inspection process cycle to the calibration process cycle, the MPU 60 issues the timing signal S7 to the semiconductor switches 76 and 78 at a time point immediately after the end of the inspection process cycle, i.e., immediately after $t_{12}$, so as to short-circuit the terminals 76a and 78a, and thereafter the switches 72 and 74 are positioned to the respective output terminals 72a and 74a before time point $t_{13}$.

In the measurement process cycle, the flow signal produced by the sensor 2 is received by the MPU 60 via the differential amplifying circuit 30, inverting amplifier 42, semiconductor switch 44 and A/D converter 50. The MPU 60 implements the flow rate calculation, and the result of calculation is stored in the memory 52 and further transformed into a unified electrical signal Io by the D/A converter 58.

In order for the electromagnetic flow meter to maintain the stable measuring condition for a long time, periodic zero-point and span calibration and confirmation of preset values are required. The test items include: (1) Zero-point check for the overall converter circuit, (2) Span check for the overall converter circuit (maximum span or arbitrary span in use), (3) Gain check for the variable-gain amplifiers 32 and 34, (4) Gain check for the A/D converter 50, (5) Operational check and calculation accuracy check for the MPU 60, (6) Conversion accuracy check for the D/A converter 58, (7) Confirmation of initial setting values, (8) Check for the constant current source 12 for producing the excitation current Iex, and (9) Check for the power supplies used for the circuits in the flow meter. Among the nine test items, check (4) is carried out in the calibration process cycle, while checks (1)-(7) except for (4) are carried out in the inspection process cycle. According to the present invention, in the measurement mode, the measurement process cycle and the calibration process cycle are performed alternately and the calculated flow rate obtained in the preceeding measurement process cycle is delivered in the succeeding calibration process cycle, as in the same manner as the conventional flow meter of FIG. 1.

In the inspection mode, a first pair of the calibration process cycle and the measurement process cycle and a second pair of the calibration process cycle and the inspection process cycle are performed alternately at a ratio of n:1 (n is an integer not less than 1). In the inspection mode, the signal Io is obtained on the basis of the calculated flow rates obtained in the succeeding two measurement process cycles.

Further, when a continuous inspection mode is set, only the calibration process and the inspection process mode are sequentially executed to thereby display the result of the inspection.

Figure 6:
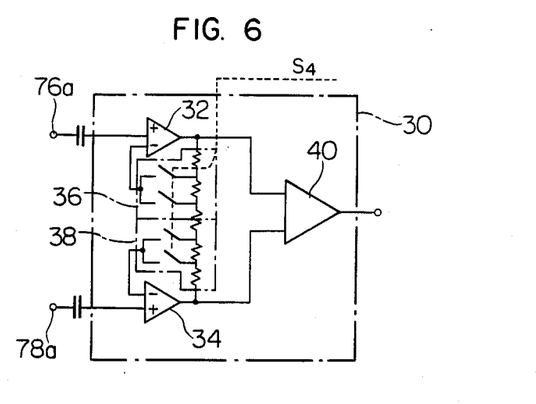
FIG. 6 is a schematic diagram showing in detail the variable-gain amplifying circuit shown in FIG. 4.
Figure 7A:
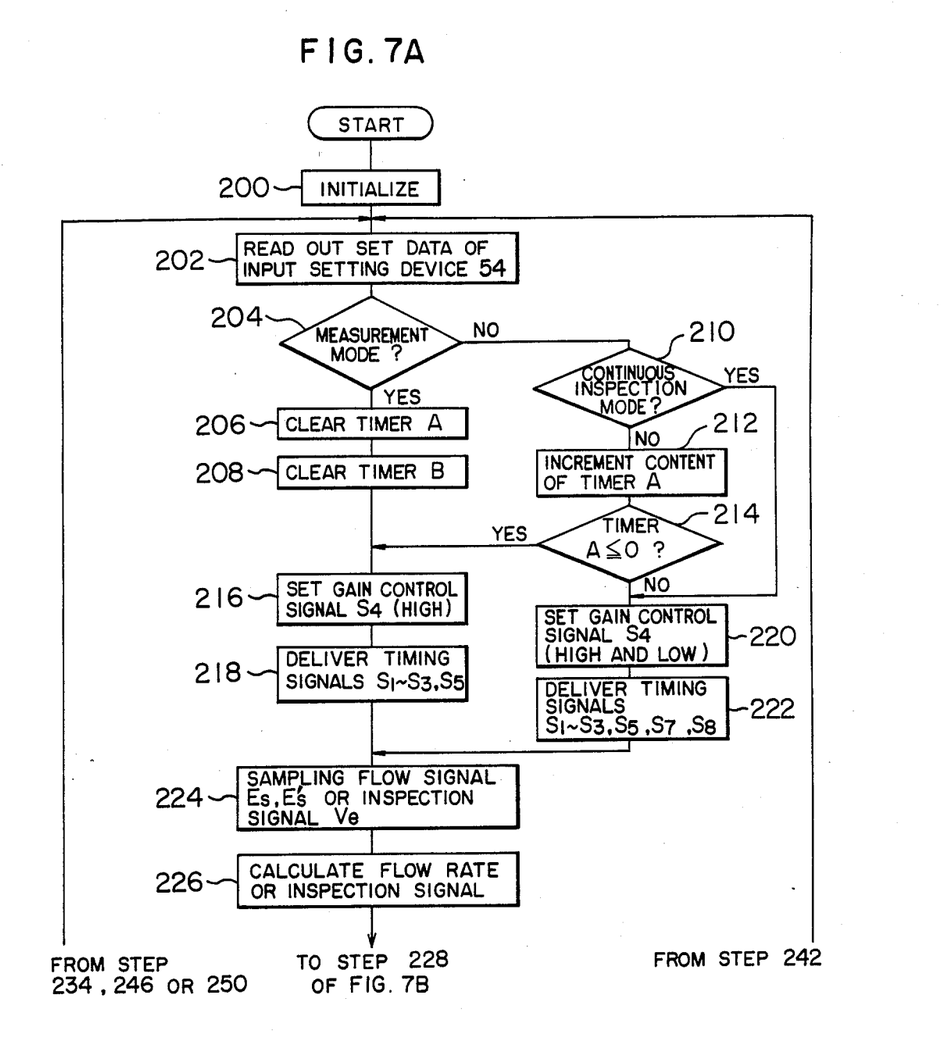
FIGS. 7A and 7B are flowcharts used to explain the operation of the embodiment shown in FIG. 4.
Figure 7B:
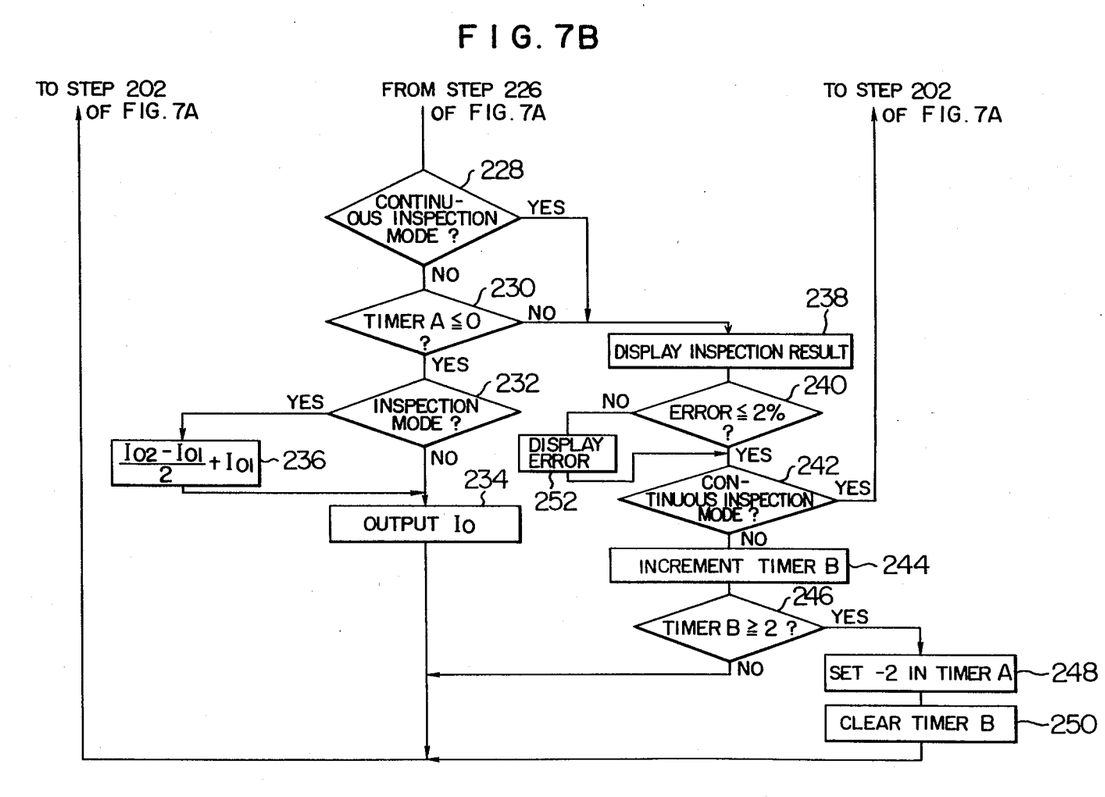

The operation of the foregoing embodiment will be described using flowcharts in FIGS. 7A, 7B. Now, in the following explanation of the embodiment, the calibration process cycles executed before each of the measurement and inspection process cycles are omitted for simplifying the explanation of the embodiment. Initially, power is turned on, and the program stored in the ROM in the MPU 60 is started for the preparation of operation in measurement mode. In step 200, initializing operation such as clear of the memory and start of timing signals is performed. In the first step 202, the MPU 60 reads a diameter of the sensor, the flow measurement range (span), etc. set on the input setting device 54, and in step 202 the MPU 60 issues the gain switching signal S4 in correspondent to the input measurement parameters to the variable-gain circuits 36 and 38. The variable-gain amplifying circuit 30 is arranged as shown in FIG. 6, where each of two variable-gain circuits includes feedback resistors and two semiconductor switches connected between the feedback resistors and the feedback input of the amplifier, and operates to set the amplifier gain by closing one of the semiconductor switches.

The MPU further reads out the operation mode among the measurement, inspection and continuous inspection modes set by the input setting device 54.

In step 204, it is checked whether the measurement mode is set or not.

If the measurement mode is set, the process proceeds to steps 206 and 208 and executes the measurement mode, as described below. In steps 206 and 208, software timers A and B provided in the RAM of the memory 52 are cleared. Then, in step 216, the gain switching signal S4 is set at a high level during the measurement mode and in step 218 the timing signals S1, S2, S3 and S5 are delivered from the MPU, as shown in a period of $t_1$-$t_3$ in FIG. 5.

Thus, the flow signal Es is applied to the switch 4a through the switch circuit 70 and the amplifier circuit 30 and, in step 224 the positive flow signal Es is sampled by the switch 44a and applied to the A/D converter 50.

In step 226, the MPU fetches the output of the A/D converter 50 and calculates the flow rate on the basis of the flow signal Es to thereby store the calculated flow rate in the memory.

Then, the process proceeds to step 228, wherein it is checked whether the continuous inspection mode is set or not. In this case, since the measurement mode is set, the process proceeds to step 230.

In step 230, it is judged whether the content of the timer A is larger than zero or not. The content is zero at this time, so that the process proceeds to step 232 wherein it is checked whether the inspection mode is set or not. Since the inspection mode is not set, the calculated flow rate obtained in step 226 is delivered to the D/A converter 58 and the signal Io is applied to the output terminal 60, in step 234.

Then, the process returns to step 202 and reads out the set data of the input setting device 54.

Since the measurement mode is set, the process repeats steps 202, 204, 206, 208, 216, 218, 224, 226, 228, 230, 232 and 234 again. In this case, in step 224, the negative flow signal −Es′ is sampled by the switch 44b in response to the timing signal S5 and applied to the A/D converter 50. Next, in step 226, the flow rate is calculated on the basis of the outputs of the A/D converter 50 associated with the present flow signal −Es′ and the preceeding flow signal Es in accordance with a following equation (1), $$\frac{(Es + Eo) - (-Es' + Eo)}{2}, \qquad (1)$$

where Eo represents a DC noise voltage.

This calculated flow rate is delivered in step 234.

In this way, a measurement process cycle is executed during a period of $t_1$–$t_6$ and as long as the measurement mode is set, the measurement cycles are repeatedly executed. Now, in the actual measurement mode, the calibration process cycle is executed, by performing steps same as the measurement process cycle such that step 218 is modified so as to deliver the timing signals S1–S3 and S6, to thereby perform the measurement process cycle and the calibration process cycle alternately.

Explanation will be made about a case where it is determined that the inspection mode is set by the input setting device 54, in step 202. In this case, the process proceeds to step 210 through 204, wherein it is checked whether the continuous inspection mode is set or not. In this case, since the inspection mode is set, the process proceeds to step 212 where the content of the timer A is incremented by one. Namely, the content thereof is set at one. Then, in step 214, it is judged whether the content of the timer A is smaller than one. At this time, the content of the timer A is one, so that the process proceeds to step 220. In step 220, the gain control signal S4 is delivered from the MPU in a manner that it is periodically changed from a high level to a low level only during the execution of the inspection process cycle, e.g. during a period of $t_6$–$t_{12}$ as shown in (k) of FIG. 5. Then, in step 222, the timing signals S1–S3, S5, S7 and S8 are delivered. The timing signal S7 is delivered at the start of the inspection process cycle, i.e. at $t_6$. The inspection timing signal S8 is set at a high level only during the execution of the inspection process cycle in synchronous with the gain control signal as shown in (j) of FIG. 5.

Thus, at a time $t_6$, a zero volt signal caused by the closure of switches 76 and 78, and then at time $t_7$ the inspection signal Ve are applied to the switch 44a from the inspection signal generator 66 through the switch circuit 70 and the amplifier circuit 30 as shown in a period of $t_6$–$t_9$ in (h) of FIG. 5. In step 224, the zero volt signal and a hatched portion of the inspection signal Ve ((h) of FIG. 5) is sampled by the switch 44a in accordance with the timing signal S5 and applied to the A/D converter. In step 226, the MPU fetches the output of the A/D converter 50 to thereby calculate a zero point and a span point in accordance with the outputs of the A/D converter associated with the zero volt signal and the inspection signal Ve.

Further, the above-mentioned inspection operations (1), (2), (3), (5), (6) and (7) are implemented by comparing the zero point and span point calculated on the basis of the actual outputs of the A/D converter 50 with the correct zero point and span point etc. based on the calibration curve stored in the memory 52, and also by checking the initial setting values.

Then, the process proceeds to step 228 wherein it is checked whether the continuous inspection mode is set or not. In this case, it is judged to be No, and in step 230 it is checked whether the content of the timer A is less than one or not. In this case, the content thereof is one, so that the process proceeds to step 238. In step 238, the results of the inspection performed in step 226 are displayed on the display device 56. In step 240, it is judged whether the difference (error) between the calculated zero point (span point etc.) and the correct zero point (span point etc.) is more than 2% or not. If the error is within 2%, the process proceeds to step 242. If the error is more than 2%, the process proceeds to step 252 where the error is displayed on the display device 56 and then proceeds to step 242.

In step 242, it is checked whether the continuous inspection mode is set or not. In this case, since the inspection mode is set, the process proceeds to step 244 where the content of the timer B is increased by one. Namely, the content of the timer B is changed from 0 to 1.

The content of the timer B is checked whether it is more than 1 or not. Since the content thereof is 1 in this case, the process proceeds to step 202. Then, the process proceeds to step 212 through steps 202, 204 and 210. In step 212, the content of the timer A is incremented from 1 to 2 and then executes steps 220, 222. In step 224, the inspection signal −Ve appearing in a period of $t_{10}$–$t_{12}$ in FIG. 5 is sampled by the switch 44b in response to the timing signal S5 at a time $t_{11}$ and then applied to the A/D converter. In step 226, the span point is obtained on the basis of the present output of the A/D converter and the previous output of the A/D converter to thereby obtain the error.

Then, the process proceeds to step 238 through steps 228 and 230 to thereby display the result of the inspection obtained at step 226.

If the error exceeds 2%, the error is displayed on the display unit 56 in step 252. In step 244, the content of the timer B is incremented from 1 to 2, then the process proceeds to step 248 since it is judged that the content of the timer B is not smaller than 2 in step 246.

The content of the timer A is set to be −2 in step 248, and the content of the timer B is cleared, i.e. reset to zero.

Thus, the inspection process cycle is performed.

Then, the process proceeds to step 212 through steps 202, 204 and 210.

In step 212, the content of the timer A is incremented from −2 to −1, and so it is judged that the content of the timer A is not larger than 0 in step 214.

Then, the process proceeds to step 216 to thereby start the measurement process cycle during a period of $t_{12}$–$t_{18}$. In steps 216, 218, 224 and 226, the flow signal Es appearing during a period of $t_{13}$–$t_{15}$ is sampled and flow rate is calculated on the basis of the outputs of the A/D converter associated with the present flow signal Es and the preceeding flow signal −Es′. After execution of steps 216, 218, 224, 226 and 228, it is checked whether the content of the timer A is not larger than 0 or not in step 230. In this case since the content thereof is −1, the process proceeds to step 232 where it is judged that the inspection mode is set. Thus, the process proceeds to step 236 where the flow rate is calculated on the basis of following equation (2), $$\frac{I_{02} - I_{01}}{2} + I_{01} \qquad (2)$$

where $I_{01}$ represents the flow rate calculated in step 226 of the preceeding measurement cycle on the basis of the equation (1), $I_{02}$ the flow rate calculated in step 226 of the present measurement cycle on the basis of the equation (1).

This calculated flow rate is delivered through the D/A converter 58 to the output terminal 60 in step 234.

Then, the process proceeds to step 212 through steps 202, 204 and 210. In step 212, the content of the timer A is incremented from −1 to 0 and the process proceeds to steps 216, 218, 224, 226, 228 and 230 through step 214 since it is decided to be Yes in step 214. In steps 216, 218 and 224, the flow signal $-Es'$ appearing during a period of $t_{16}-t_{18}$ is sampled by the switch 44b and then applied to the A/D converter. In step 226, the flow rate is calculated on the basis of the outputs of the A/D converter associated with the present flow signal $-Es'$ and the preceding flow signal Es.

Then, the process proceeds to step 236 through steps 230 and 232, wherein the flow rate is calculated in accordance with the equation (2) and then the calculated flow rate is delivered in step 234.

Thus, the measurement cycle is performed. Thereafter, the process proceeds to step 212 through steps 202, 204 and 210, wherein the content of the counter A is incremented from 0 to 1. Thus, the inspection process cycle is started.

In this way, if the inspection mode is set, the inspection process cycle and the measurement process cycle are executed alternately.

Now, in the actual inspection mode, the calibration process cycle is executed before each of the measurement and inspection process cycles.

Explanation will be made about a case where a continuous inspection mode is set.

In this case, after execution of steps 202 and 204, it is judged that the continuous inspection mode is set in step 210, then the process proceeds to step 220 to thereby start the inspection process cycle. After execution of steps 220, 222, 224 and 226, it is judged that the continuous inspection mode is set in step 228, and then the process proceeds to step 238 where the result of inspection obtained at step 226 is displayed.

In step 240, if it is judged that the error exceeds 2%, the error is displayed, in step 252. Further, it is checked whether the continuous inspection mode is set, in step 242, and then the process proceeds to step 202. In this way, when the continuous inspection mode is set, steps 202, 204, 210, 212, 214, 220, 222, 224, 226, 228, 238, 240, 242 and 252 are repeatedly executed to thereby perform only the inspection process cycle.

Now, in the actual continuous inspection mode, the calibration process cycle is performed every time before the inspection process cycle.

In this embodiment, in the inspection mode, the measurement process cycle and the inspection process cycle are performed alternately. But, the ratio of the measurement and inspection process cycles may be changed by changing a value set in step 248 or by changing a value "2" to be compared in step 246.

Namely, by changing the value "−2" set in step 248 into "−4", the inspection process cycle is performed after execution of the two measurement process cycles. On the other hand, if the value "2" to be compared in step 246 is changed into "4", the measurement process cycle is executed after execution of the two inspection process cycles.

Further, in the inspection mode, it may be modified in step 234 in a manner that when a difference between the calculated flow rates in the succeeding two measurement process cycles is within a given value, e.g. 2%, the MPU delivers to the output terminal the calculated flow rate in the latter measurement process cycle, while the MPU delivers a value obtained by a method of moving averages of the calculated flow rates in the two measurement process cycles when the difference exceeds the given value.

According to the inventive electromagnetic flow meter, which is used for the continuous flow measurement in the fields of water supply plants, drainage plants, nuclear energy plants and the like, the zero-point and span calibration for the flow signal converter and confirmation of the initial settings are carried out in a calibration mode in which the calibration process cycles and measurement process cycles are carried out at frequencies of a certain proportion. Accordingly, the flow measurement takes place automatically even during the calibration mode, whereby the calibration and checking of the flow meter can be carried out easily without suspending the flow measurement, i.e., without turning off the power supply to the flow meter.

We claim:

1. An electromagnetic flow meter comprising:
   a conduit in which liquid under measurement flows;
   magnetic field generating means for producing a magnetic field alternating with a constant frequency in a radial direction of said conduit;
   a pair of electrodes provided on the interior surface of said conduit, said surface being perpendicular to the direction of said magnetic field and to the axial direction of said conduit;
   an inspection signal generator for producing inspection signals having the same period as a period of flow signals produced by said electrodes;
   switch means having a first state in which the input terminals of said switch means are connected to said electrodes and a second state in which the input terminals of said switch means are connected to the output terminals of said inspection signal generator;
   conversion means connected to the output terminals of said switch means and adapted to convert signals from said switch means into a signal representing a flow rate of said liquid;
   an input setting device on which measurement conditions and operating modes including a flow rate measurement mode and inspection mode are set;
   control means which controls said magnetic field generating means, said switch means and said conversion means in accordance with measurement conditions set on said input setting device, and calculates a flow rate based on the output signal of said conversion means to thereby deliver a signal representing the calculated flow rate to an output terminal; and
   a display device for displaying a calculation result produced by said control means, wherein said control means sets said switch means to the first state in response to the measurement mode set on said input setting device and executes repeatedly in synchronous with said constant frequency a measurement process cycle for calculating a flow rate on the basis of the flow signals produced by said electrodes to thereby deliver the signal representing the calculated flow rate to said output terminal, said control means sets said switch means alternately to the first and second states in synchronous with said constant frequency in response to the inspection mode set on said input setting device, wherein said control means executes the measurement process cycle when said switch means is in the first state and executes an inspection process cycle of said conversion means on the basis of said inspection signal to thereby deliver the result of inspection when said switch means is in the second state, and in the inspection mode, said control means stores flow rates calculated in said measurement process cycles and calculates a flow rate on the basis of the stored flow rates to thereby deliver it to said output terminal.

2. An electromagnetic flow rate according to claim 1, wherein the measurement process cycle and the inspection process cycle are executed at a ratio of n:1 (n is an integer not smaller than 1), in said inspection mode.

3. An electromagnetic flow meter according to claim 1, wherein the result of inspection is displayed on said display device, in said inspection mode.

4. An electromagnetic flow meter according to claim 1, wherein, in said inspection mode, when a difference between the calculated flow rates in the succeeding two measurement process cycles is within a given value, said control means delivers to said output terminal the calculated flow rate in the latter measurement process cycle, while said control means delivers a value obtained by a method of moving averages of the calculated flow rates in the two measurement process cycles when the difference exceeds said given value.

5. An electromagnetic flow meter according to claim 1, wherein said control means measures a deviation of the calculated value from a standard calibration curve of said flow meter and display the deviation on said display device in said inspection process cycle.

6. An electromagnetic flow meter according to claim 5, wherein in said inspection mode, said control means calculates the zero point and span point on the basis of said inspection signals and compare them with the zero point and span point of the correct flow meter calibration curve to thereby display the result of comparison on said display device.

7. An electromagnetic flow meter according to claim 1, wherein in said inspection mode, said control means calculates the flow rate in accordance with a method of moving averages of the flow rates calculated in the succeeding two measurement process cycles to thereby deliver it to said output terminal.

8. An electromagnetic flow meter according to claim 1, wherein said conversion means includes a variable gain differential amplifier connected to the output of said switching means, an A/D converter connected to the output of said variable gain differential amplifier and a calibration signal generator, said control means allows said calibration signal generator to deliver a calibration signal to said A/D converter and fetches the output of said A/D converter and compares with a pregiven value to thereby display the result of comparison, before execution of each of said measurement and inspection process cycle.

9. An electromagnetic flow meter according to claim 8, wherein said control means controls the gain of said differential amplifier in a manner that it is changed during said inspection process cycle.

* * * * *